United States Patent
Sakurai

(10) Patent No.: US 8,594,380 B2
(45) Date of Patent: Nov. 26, 2013

(54) LANE MARKING DETECTION APPARATUS, LANE MARKING DETECTION METHOD, AND LANE MARKING DETECTION PROGRAM

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 13/062,765

(22) PCT Filed: Oct. 7, 2009

(86) PCT No.: PCT/JP2009/067471
§ 371 (c)(1),
(2), (4) Date: Mar. 15, 2011

(87) PCT Pub. No.: WO2010/047226
PCT Pub. Date: Apr. 29, 2010

(65) Prior Publication Data
US 2011/0164790 A1    Jul. 7, 2011

(30) Foreign Application Priority Data
Oct. 22, 2008    (JP) .................... 2008-271813

(51) Int. Cl.
*G06K 9/00*    (2006.01)
(52) U.S. Cl.
USPC ........................................ 382/104
(58) Field of Classification Search
USPC .............. 382/104; 340/901, 903, 933, 935, 340/937–939; 701/300, 302
See application file for complete search history.

(56) References Cited

U.S. PATENT DOCUMENTS

| | | | | |
|---|---|---|---|---|
| 4,866,617 A * | 9/1989 | Matsuda et al. | ................. | 701/25 |
| 5,835,028 A * | 11/1998 | Bender et al. | ................. | 340/937 |
| 7,006,667 B2 * | 2/2006 | Akutagawa | ................. | 382/104 |
| 7,050,908 B1 * | 5/2006 | Schwartz et al. | ............. | 701/300 |
| 7,421,095 B2 * | 9/2008 | Ikeda et al. | .................... | 382/104 |
| 7,675,655 B2 * | 3/2010 | Marshall et al. | .............. | 358/486 |
| 8,121,350 B2 * | 2/2012 | Klefenz | ........................ | 382/104 |
| 2001/0056326 A1 * | 12/2001 | Kimura | ........................ | 701/208 |
| 2002/0080235 A1 * | 6/2002 | Jeon | ............................. | 348/116 |

(Continued)

FOREIGN PATENT DOCUMENTS

| | | |
|---|---|---|
| JP | 7-78234 A | 3/1995 |
| JP | 9-7099 A | 1/1997 |

(Continued)

OTHER PUBLICATIONS

International Search Report for PCT/JP2009/067471 mailed Dec. 22, 2009.

*Primary Examiner* — Shervin Nakhjavan

(57) ABSTRACT

A lane marking detection apparatus, a lane marking detection method, and a lane marking detection program is provided, which can detect a lane marking precisely even when noise is present. The lane marking detection apparatus is provided with an original image acquiring means which acquires an original image obtained by imaging a road from a traveling object traveling along the road, a lane marking position detection means which detects the relative position of a lane marking included in the road, from the traveling object, based on the original image, and a examination means which examine the result of the detection obtained by the lane marking position detection means, based on a partial image of a first image that is an original image at time t0 and the partial image of a past image that is the original image captured before time t0.

8 Claims, 14 Drawing Sheets

(56) References Cited

U.S. PATENT DOCUMENTS

| | | | |
|---|---|---|---|
| 2002/0081001 A1* | 6/2002 | Tsuji | 382/104 |
| 2002/0188404 A1* | 12/2002 | Jeon | 701/301 |
| 2004/0164851 A1* | 8/2004 | Crawshaw | 340/435 |
| 2004/0230375 A1* | 11/2004 | Matsumoto et al. | 701/301 |
| 2005/0031169 A1* | 2/2005 | Shulman et al. | 382/104 |
| 2006/0145827 A1* | 7/2006 | Kuge et al. | 340/439 |
| 2006/0206243 A1* | 9/2006 | Pawlicki et al. | 701/1 |
| 2007/0088478 A1* | 4/2007 | Mori et al. | 701/41 |
| 2008/0181488 A1* | 7/2008 | Ishii et al. | 382/154 |
| 2009/0041303 A1* | 2/2009 | Aoki et al. | 382/104 |

FOREIGN PATENT DOCUMENTS

| | | |
|---|---|---|
| JP | 2000011298 A | 1/2000 |
| JP | 2001175999 A | 6/2001 |
| JP | 2002029347 A | 1/2002 |
| JP | 2006012191 A | 1/2006 |
| JP | 2006069323 A | 3/2006 |
| JP | 2007241468 A | 9/2007 |

* cited by examiner

# LANE MARKING DETECTION APPARATUS, LANE MARKING DETECTION METHOD, AND LANE MARKING DETECTION PROGRAM

TECHNICAL FIELD

The present invention relates to a lane marking detection apparatus, a lane marking detection method, and a lane marking detection program.

BACKGROUND ART

A lane change detection apparatus for detecting a lane change of a vehicle is described in patent literature 1 (Japanese patent publication JP-2007-241468A). This lane change detection apparatus is provided with an imaging means adapted to take an image of a road surface on the front side or the rear side of the vehicle, a recognition means adapted to process the image obtained by the imaging means and recognize lane markings on the road surface, and a detection means adapted to detect start of the lane change. In a case where the detection means does not detect the start of the lane change, the recognition means recognizes both lane markings positioned on the both sides of the vehicle. After the detection means detects the start of the lane change, the recognition means recognizes only the lane marking positioned on the lane change side among the lane markings positioned on the both sides of the vehicle at the start of the lane change.

As a related technique, a patent literature 2 (Japanese patent publication JP-2002-29347A) describes a technique having an object to provide a vehicle traveling lane marking detection apparatus capable of promptly determining a lane change.

As another related technique, a patent literature 3 (Japanese patent publication JP-2006-12191A) describes a technique having an object to precisely and accurately recognize traveling lane markings.

DISCLOSURE OF INVENTION

It is desired to precisely identify whether or not a lane change is performed. However, an image obtained by an imaging apparatus may contain a noise. Due to such a noise, lane markings may be incorrectly detected.

Thus, an object of the present invention is to provide a lane marking detection apparatus, a lane marking detection method, and a lane marking detection program, which can accurately detect lane markings even when a noise is present.

A lane marking detection apparatus according to the present invention includes: an original image acquirement means adapted to acquire an original image obtained by taking an image of a traveling road from a traveling object traveling on the traveling road; a lane marking position detection means adapted to detect a relative position of a lane marking included in the traveling road from the traveling object, based on the original image; and an examination means adapted to examine a detection result of the lane marking position detection means based on a partial image extracted from a first image that is the original image obtained at time t0, and a partial image extracted from a past image that is the original image obtained before time t0.

A car navigation system according to the present invention includes the above lane marking detection apparatus, a position grasp means adapted to grasp a position of the traveling object based on an examination result of the examination means, and a notification means adapted to notify the position grasped by the position grasp means to a user.

A turn signal system according to the present invention includes the lane change detection apparatus mentioned above, and a turn signal control means adapted to control a turn signal provided in the traveling object based on an examination result of the examination means.

A lane marking detection method according to the present invention includes: acquiring an original image obtained by taking an image of a traveling road from a traveling object traveling on the traveling road; detecting a relative position of a lane marking included in the traveling road from the traveling object based on the original image; and examining a detection result in the detecting based on a partial image of a first image that is the original image obtained at time t0, and a partial image of a past image that is the original image obtained before the time t0.

A lane marking detection program according to the present invention is a program causing a computer to execute the steps of: acquiring an original image obtained by taking an image of a traveling road from a traveling object traveling on the traveling road; detecting a relative position of a lane marking included in the traveling road to the traveling object based on the original image; and examining a detection result in the detection based on a partial image of a first image that is the original image obtained at time t0, and a partial image of a past image that is the original image obtained before time t0.

According to the present invention, the lane marking detection apparatus, the lane marking detection method, and the lane marking detection program are provided, which can accurately detect the lane marking even when a noise is present.

BEST MODE FOR CARRYING OUT THE INVENTION

Figure 1:
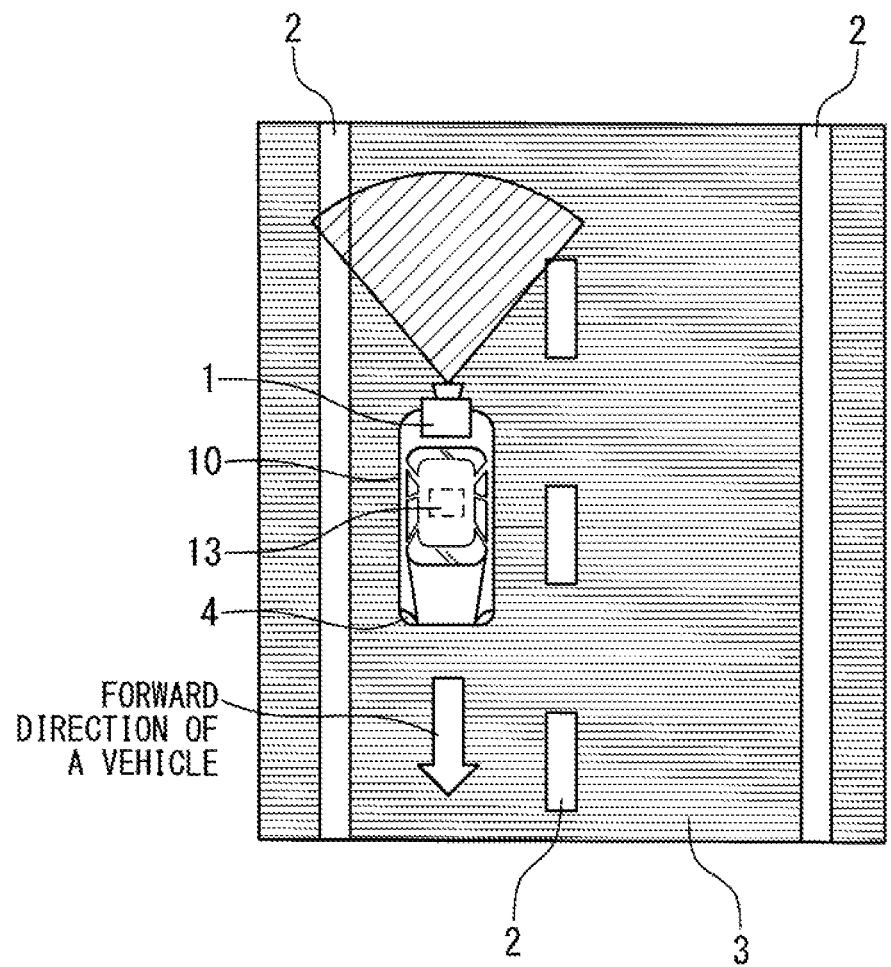
FIG. 1 is a schematic diagram showing a vehicle traveling on a traveling road.

Hereinafter, an embodiment of the present invention will be described referring to the drawings.

A lane marking detection apparatus 13 according to the present embodiment is an apparatus for detecting whether or not a vehicle (a traveling object) performs a lane change, and is provided in a vehicle 10. FIG. 1 is a schematic diagram showing the vehicle 10 traveling on a traveling road 3. Lane markings 2 dividing lanes are provided on the traveling road 3. The vehicle 10 includes a turn signal 4, and a camera 1. The camera 1 captures an image of the traveling road 3 in a direction opposite to the forward direction of the vehicle 10. The captured image is notified to the lane marking detection apparatus 13. The lane marking detection apparatus 13 detects whether or not the lane change is performed based on the captured image. A detection result by the lane marking detection apparatus 13 is used for controlling the turn signal 4 or a car navigation system (not shown).

Figure 2:
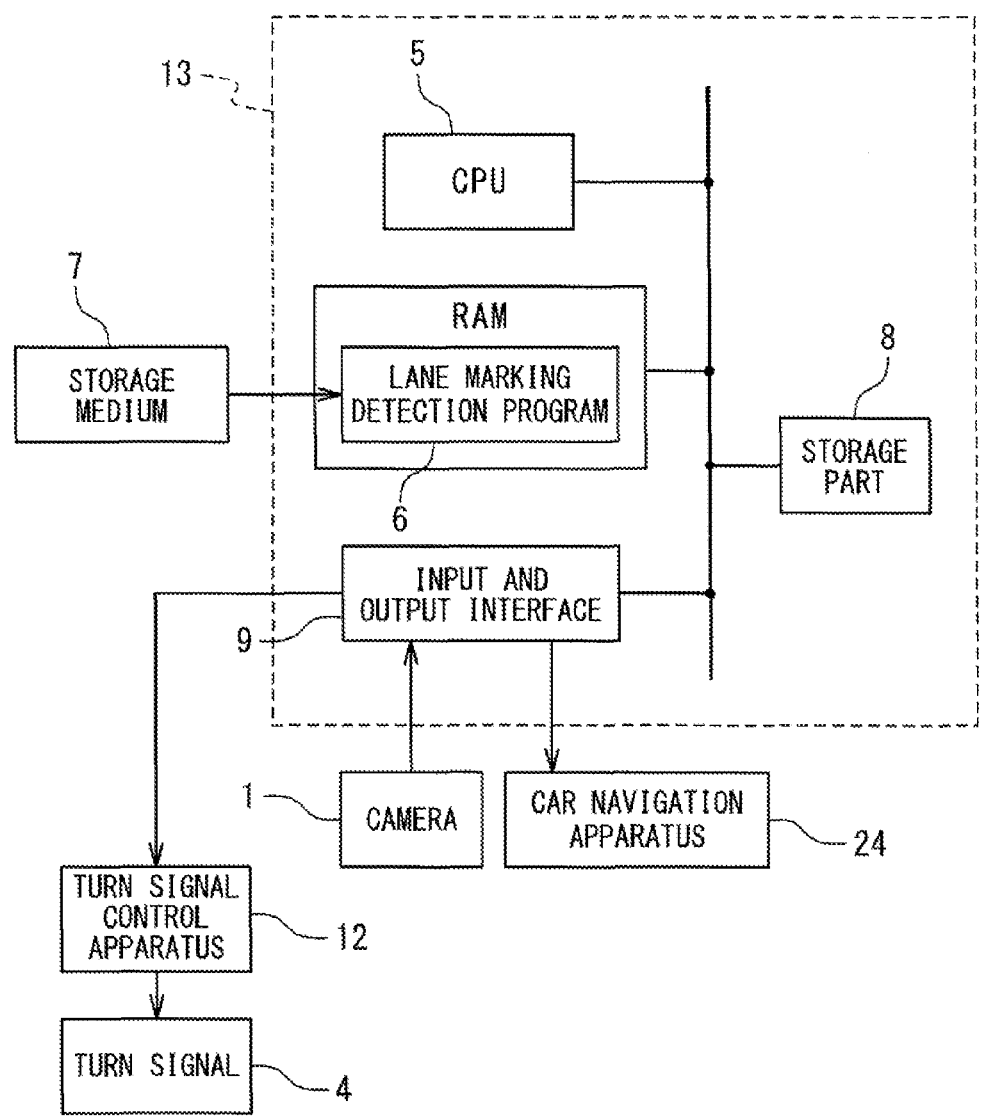
FIG. 2 is a block diagram showing a configuration of a lane marking detection apparatus.

FIG. 2 is a block diagram showing a configuration of the lane marking detection apparatus 13. The lane marking detection apparatus 13 is realized by a computer having a CPU 5, a RAM (Random Access Memory), a storage part 8, and an input and output interface 9. A lane marking detection program 6 is stored in the RAM. The lane marking detection program 6 is preliminarily installed on the RAM 6 from a storage medium such as a CD-ROM. Functions of the lane marking detection apparatus 13 are realized by the CPU executing the lane marking detection program 6. The input and output interface 9 is connected to the camera 1, a car navigation apparatus 24, and a turn signal control apparatus 12. The lane marking detection apparatus 13 performs communication with the camera 1, the car navigation apparatus 24, and the turn signal control apparatus 12 via the input and output interface 9. The storage part 8 is exemplified by a hard disk or a ROM (Read Only Memory). Various data to be used by the lane marking detection program 6 is stored in the storage part 8.

Figure 3:
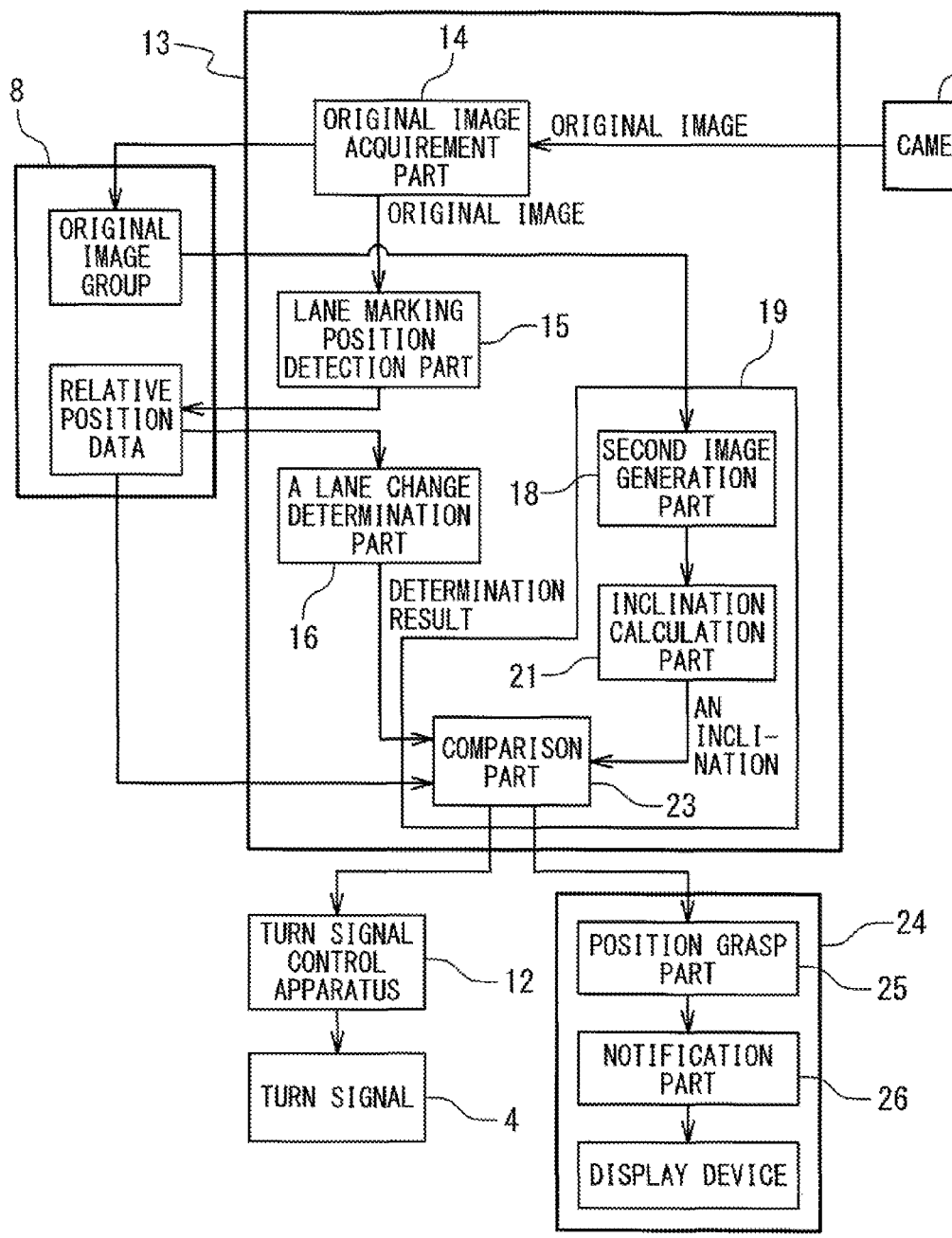
FIG. 3 is a functional configuration diagram showing the lane marking detection apparatus.

FIG. 3 is a function block diagram showing a functional configuration of the lane marking detection apparatus 13. The lane marking detection apparatus 13 includes an original image acquirement part 14, a lane marking position detection part 15, a lane change determination part 16, and an examination part 19. The examination part 19 includes a second image generation part 18, an inclination calculation part 21, and a comparison part 23.

An original image group and relative position data are stored in the storage part 8 while being respectively related to times.

Figure 4:
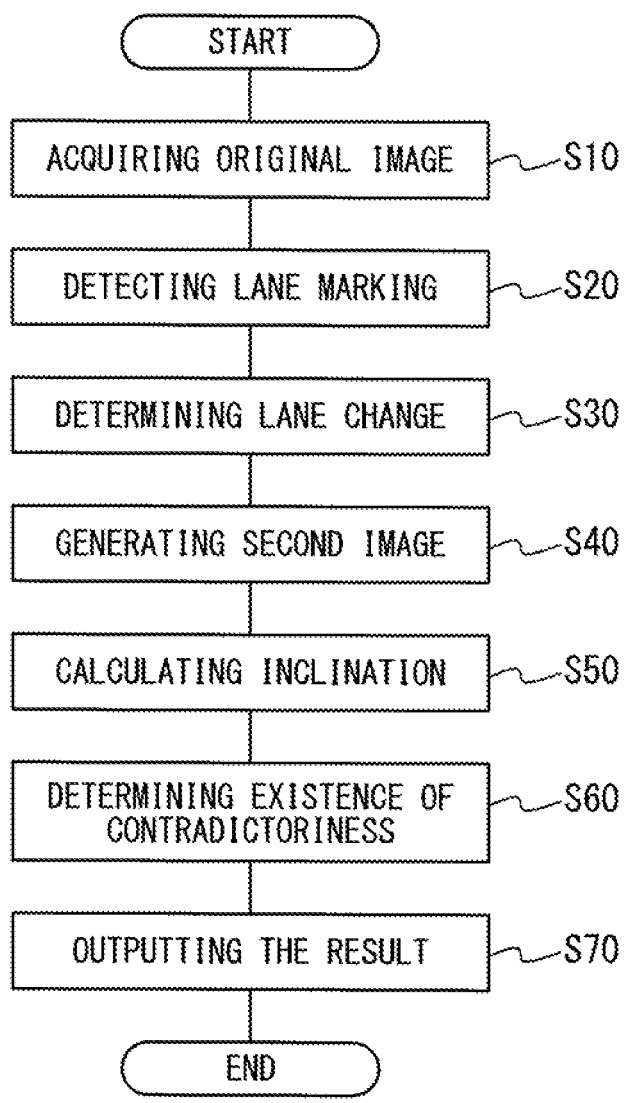
FIG. 4 is a flowchart showing a lane marking detection method.

FIG. 4 is a flowchart showing an operation method of the lane marking detection apparatus 13.

Step S10; Acquiring Original Image

Figure 5:
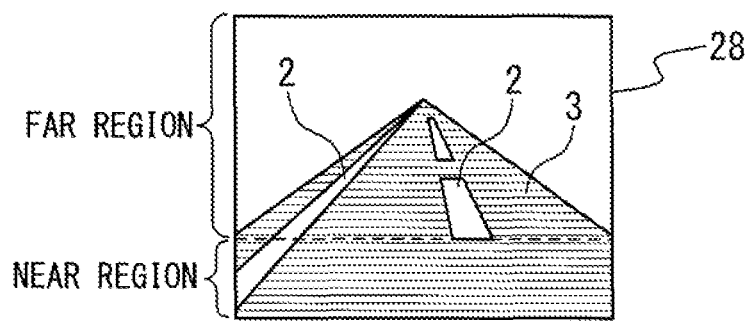
FIG. 5 is a concept diagram showing an original image.

The original image acquirement part 14 acquires an image obtained by the camera 1 as an original image 28. FIG. 5 is a concept diagram showing the original image 28. The original image 28 includes a far region in which a region distant from the vehicle 10 is imaged, and a near region in which a region close to the vehicle 10 is imaged. The original image acquirement part 14 acquires the original image at predetermined time intervals. The original image acquirement part 14 relates the acquired original image to time, and stores the original image in the storage part 8. Thereby, a plurality of original images (the original image group) atr stored in the storage part 8 while being related to the times.

Step S20; Detecting Lane Marking

It is assumed that the original image is acquired at present time t0. Hereinafter, the original image at time t0 is referred to as a first image. The lane marking position detection part 15 detects relative positions of the lane markings 2 to the vehicle 10 based on the first image. The lane marking position detection part 15 relates the detected relative positions to the present time t0 and stores the relative positions in the storage part 8 as the relative position data. Since such processing is performed at predetermined time intervals, the relative position data are stored in the storage part 8 for each of a plurality of times.

Step S30; Determining Lane Change

The lane change determination part 16 chronologically tracks the relative positions up to time t0 based on the relative position data, and determines whether or not the lane change is performed. When the lane change determination part 16 determines that the lane change is performed, that fact is notified to the examination part 19 as a determination result.

Determination processing in Step S30 is performed on the premise that the relative position at time t0 is accurately detected. Thus, by the following processing of Step S40 and later, it is examined whether or not the relative position is accurately detected, and the determination result of the lane change is confirmed.

Step S40; Generating Second Image

Figure 6:
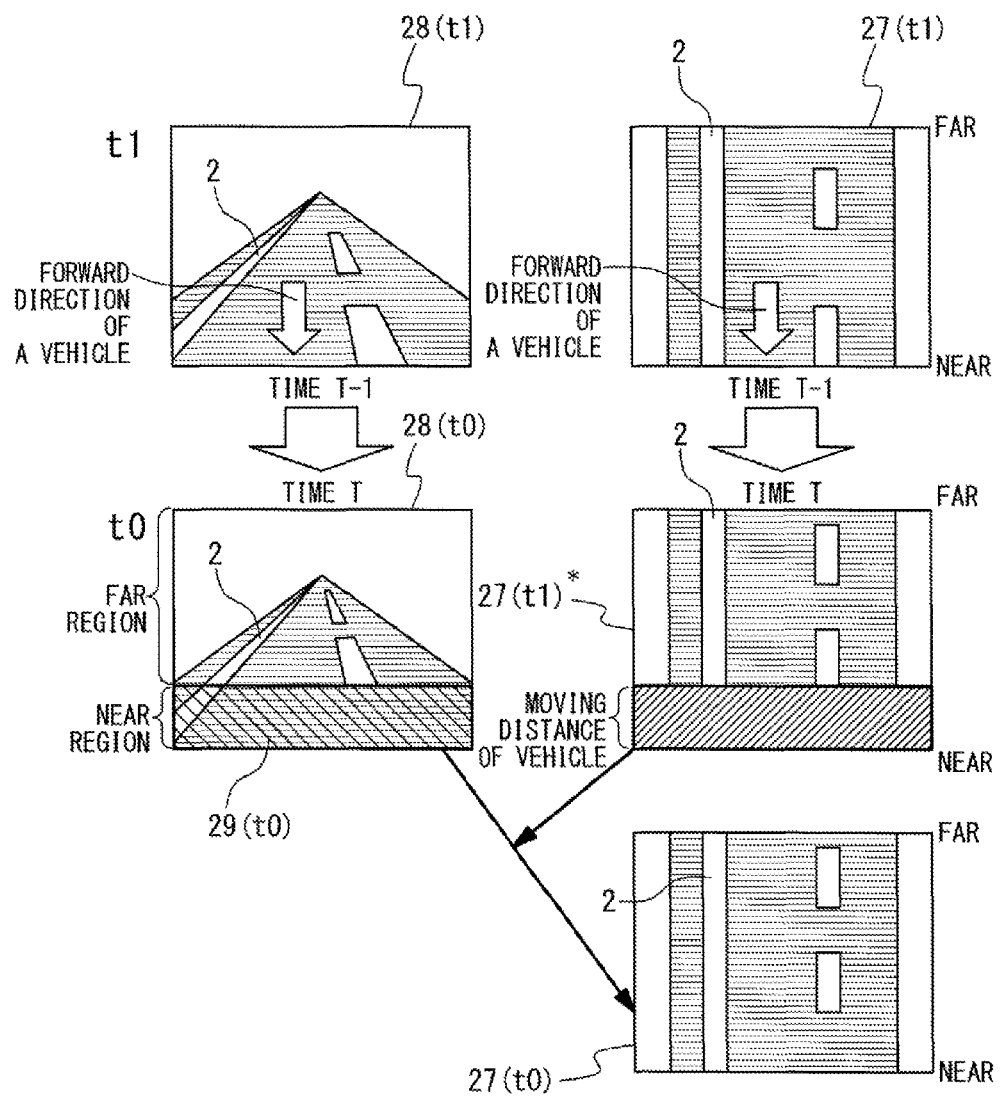
FIG. 6 is a concept diagram showing a generation method of a second image.

The second image generation part 18 generates a second image based on a partial image of the first image. The second image is an image in a case where the traveling road 3 is seen from a direction that is different from an imaging direction of the original image. Specifically, the second image is an image in which scenery captured in the original image 28 is viewed vertically downward in the real world. The second image is obtained based on the partial image of the first image acquired at the present time t0, and a partial image of the original image acquired in the past. FIG. 6 is a concept diagram showing operations in the present step. The operations in the present step will be described in detail referring to FIG. 6.

Assuming that an original image 28 (t0) (the first image) is obtained at present time t0 as shown in FIG. 6. Also assuming that an original image 28 (t1) is acquired at a past time t1 before present time t0. Also assuming that a second image 27 (t1) is generated at time t1 based on the original image 28 (t1).

The second image generation part 18 moves pixels of the second image 27 (t1) generated at previous time t1 in a far direction by a quantity corresponding to a moving distance of the vehicle 10, so as to generate an image 27 (t1)*. In the image 27 (t1)*, a near-vehicle region is blank.

Next, the second image generation part 18 transforms a near region included in the first image 28 (t0) into an image viewed vertically downward (that is, a bird's eye image). The transformed image is added to a blank portion of the image 27 (t1)*. Thereby, a second image 27 (t0) at time t0 is generated.

The above processing is executed every time when the original image 28 is acquired. That is, every time when an original image 28 (t) is acquired at time a second image 27 (t) is generated. Therefore, the second image 27 (t1) at time t1 is an image generated based on partial images of the original images 28 acquired before time t1. That is, it can be said that the second image 27 (t0) is an image obtained by connecting the partial image of the first image and the partial images of the original images 28 acquired before time t0.

The second image 27 (t0) obtained in such a way includes not the far region but only the near region of the original image 28. In the original image 28, the far region more highly possibly contains a noise than the near region. Therefore, in the second image 27, the noise due to the far region is eliminated.

It should be noted that a non-synthetic bird's eye image, a processed image to which filtering processing or the like is performed, and the like may be used as the second image 27. An image obtained by further performing the filtering processing or the like to the image 27 (t0) may be used as the second image 27.

The second image generation part 18 notifies the generated second image 27 to the examination part 19.

Figure 7:
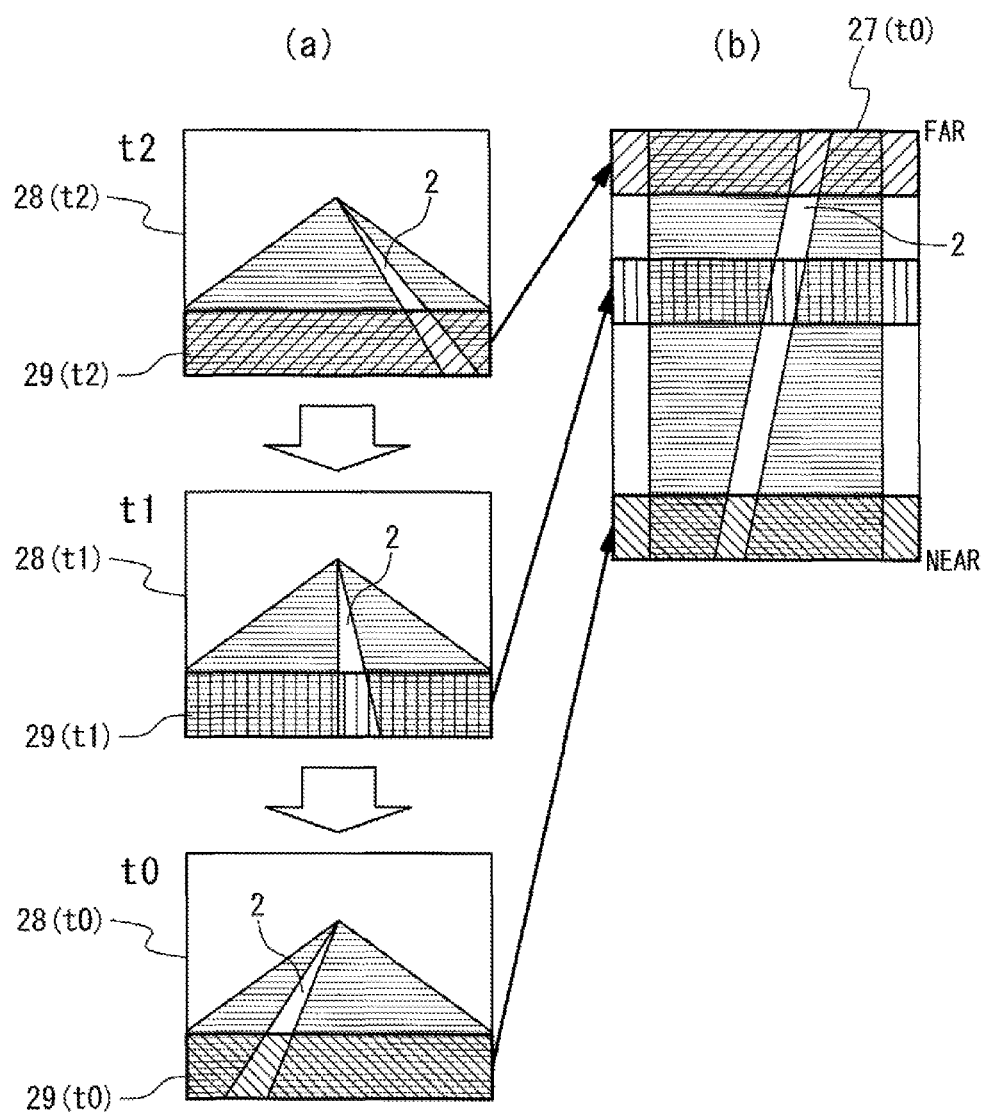
FIG. 7 is a concept diagram showing a calculation method of an inclination.

Successively, processing of Step S50 and later will be described. FIG. 7 is a concept diagram for illustrating operations in Steps S50 to 70.

Step S50; Calculating Inclination

Assuming that the vehicle 10 performs the lane change in a period from time t2 to time t0. In this case, as shown in FIG. 7(*a*), an original image 28 (t2) is generated at time t2, the original image 28 (t1) is generated at time t1, and the original image 28 (t0) is generated at time t0. In a case where the lane change is performed, the relative position of the lane marking 2 from the vehicle 10 is changed between the plurality of original images 28 (t2 to t0). As a result, when traveling speed of the vehicle 10 is proper speed, as shown in FIG. 7(*b*), the lane marking 2 is shown to obliquely extend in the second image 27 (t0). In Step S60, the inclination calculation part 21 calculates inclination of the lane marking 2. The calculated inclination is notified to the comparison part 23.

Step S60; Determining Existence of Contradictoriness

The inclination calculated in Step S50 should correspond to a relationship between the times and the relative positions of the lane marking 2. Therefore, the comparison part 23 refers to the relative position data and determines whether or not the calculated inclination is contradictory to the relative position data.

Step S70; Comparing

When no contradictoriness is found in Step S60, a detection result in the lane marking position detection part 15 is considered to be correct. Therefore, the determination result in the lane change determination part 16 is also considered to be correct. In the case where the lane change determination part 16 determines that the lane change is performed, the comparison part 23 determines (examines) that the determination result by the lane change determination part 16 is correct. That is, the fact that the lane change is performed is outputted. Meanwhile, in the case where the contradictoriness is found in Step S60, the detection result in the lane marking position detection part 15 is considered to be incorrect. Therefore, the comparison part 23 determines that the determination result in the lane change determination part 16 is incorrect. Even in the case where the lane change determination part 16 determines that the lane change is performed, the comparison part 23 determines that the lane change is not performed.

In a case where the comparison part 23 determines that the lane change is performed, that fact is notified to the turn signal control apparatus 12, and the car navigation apparatus 24.

The turn signal control apparatus 12 controls the turn signal 4. For example, when the lane change is started, the turn signal 4 generally blinks. In such a case, the turn signal control apparatus 12 turns off the turn signal 4 in accordance with the notification of the fact that the lane change is performed (completed).

As shown in FIG. 3, the car navigation apparatus 24 includes a position grasp part 25, a notification part 26, and a display device 11 (such as a display). When the fact that the lane change is performed is notified to the car navigation apparatus 24, the position grasp part 25 grasps a current position of the vehicle 10. The notification part 26 displays the current position on the display device 11, based on the grasped current position so as to notify the current position to a driver.

As described above, according to the present embodiment, the examination part 19 examines whether or not the relative position detected by the lane marking position detection part 15 is correct based on the second image 27. The second image 28 does not include the far region which highly possibly contains the noise. Therefore, even when the detection result of the lane marking position detection part 15 is influenced by the noise of the far region, the influence of the noise can be eliminated by the examination part 9. Even in a case where the noise present, the relative position of the lane marking 2 can be accurately detected, and it becomes possible to accurately determine whether or not the lane change is performed.

In the present embodiment, examination is performed based on the second image 27 seen from a different view point from the original image 28. Since the original image 28 and the second image 27 have different features, incorrect detection due to the noise caused by the respective images can be suppressed. Hereinafter, this point will be described in detail.

Figure 8A:
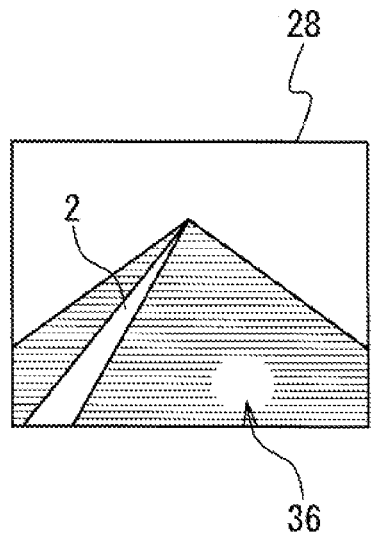
FIG. 8A is a diagram showing the original image in a case where a raindrop is present.
Figure 8B:
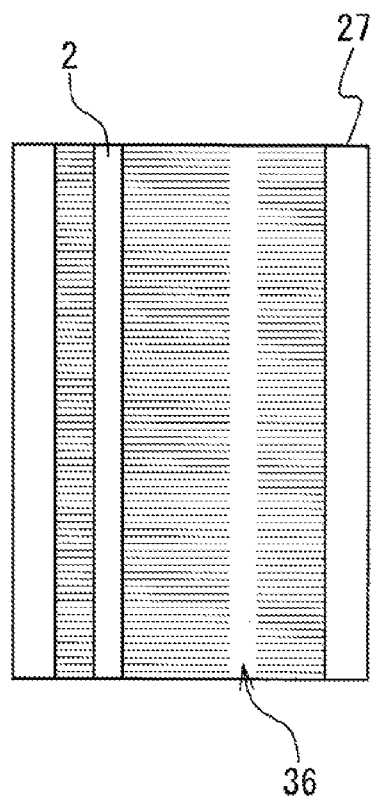
FIG. 8B is a diagram showing the second image in the case where the raindrop is present.

From a view of deleting the noise due to the far region, it is considered that the position of the lane marking 2 may be detected by using only the second image 27. However, when only the second image 27 is used, the noise easily becomes influential from another view. For example, as shown in FIG. 8A, a raindrop 36 or the like may be imaged in a near part (the near region) in the original image 28. The raindrop or the like tends to remain at a same position of the original image 28. As a result, as shown in FIG. 8B, a part of the raindrop 36 is easily imaged as a straight line like the lane marking 2 in the second image 27. Therefore, when the position of the lane marking 2 is detected based on only the second image 27, such a raindrop 36 or the like serves as a noise, so that the incorrect detection is easily generated. Meanwhile, the noise due to the raindrop 36 or the like is a partial noise in the original image 28, which is easily distinguished from the lane marking 2.

That is, according to the present embodiment, by using the image (the second image) in which the traveling road 3 is seen in the direction different from the imaging direction, causes of the incorrect detection due to the original image and the second image can be cancelled. As a result, even when the noise is present, it becomes possible to accurately detect whether or not the lane change is performed.

Example

Next, an example will be described for explaining the present invention in more detail.

As described in the embodiment, at a rear part of the vehicle 10 according to the present example, the camera 1 is provided so as to face to a direction opposite to the traveling direction (refer to FIG. 1). The lane marking detection apparatus 13 according to the present example is an apparatus for detecting a phenomenon that the lane marking 2 relatively passes through the vehicle 10 in the lateral direction, that is, a phenomenon that the vehicle 10 crosses the lane marking 2.

A configuration of the vehicle detection apparatus 13 according to the present example is substantially the same as the vehicle detection apparatus 13 according to the embodiment (refer to FIG. 3). However, in the present example, constituent elements will be more specifically described.

Firstly, configurations and operations of the lane marking position detection part 15 and the lane change part 16 will be described in detail.

Figure 9:
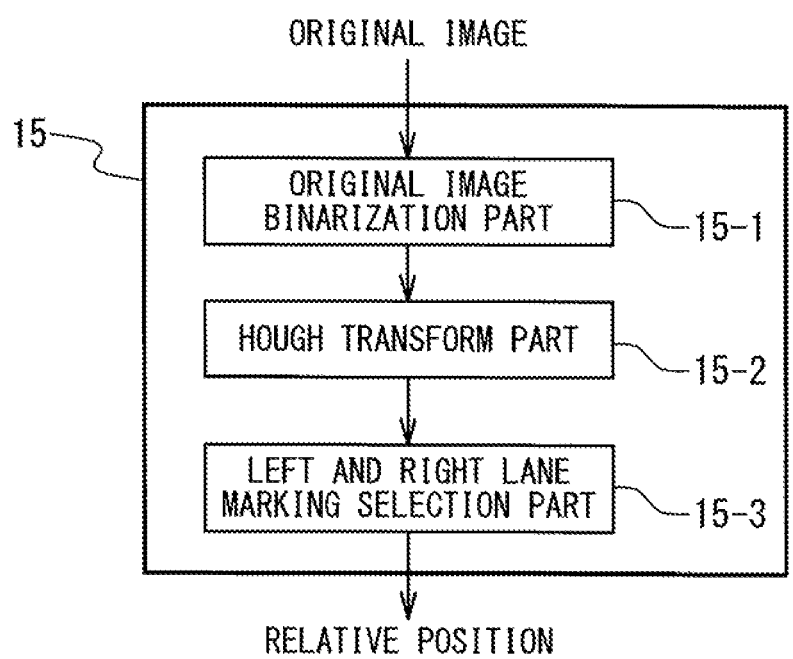
FIG. 9 is a functional configuration diagram showing a lane marking position detection part.

FIG. 9 is a functional configuration diagram specifically showing the lane marking position detection part 15. The lane marking position detection part 15 includes an original image binarization part 15-1, a Hough transform part 15-2, and a left and right lane marking selection part 15-3.

Figure 10:
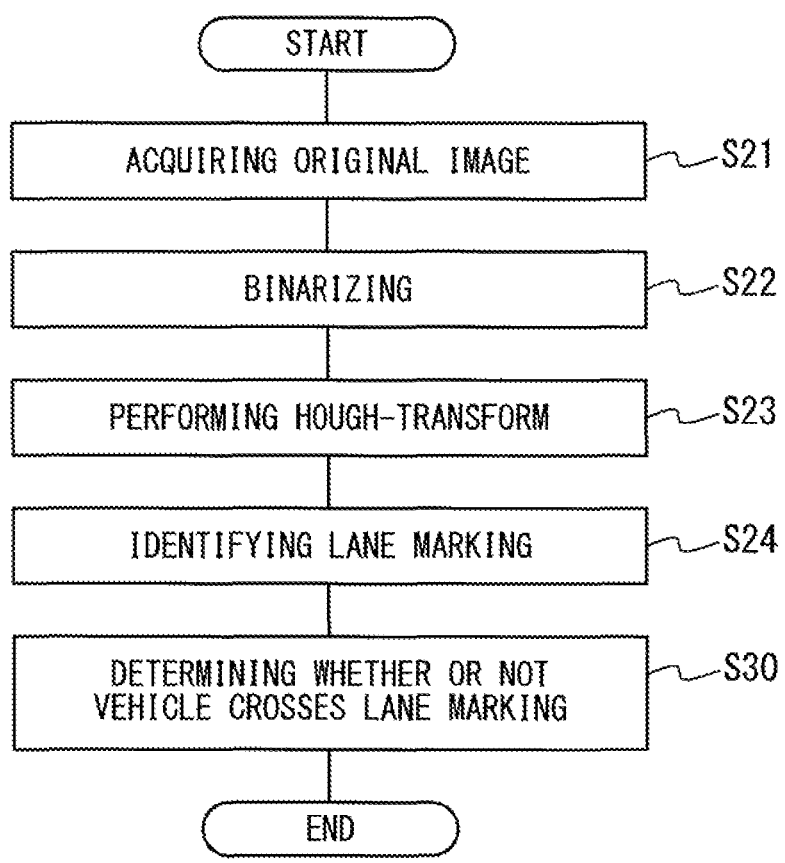
FIG. 10 is a flowchart showing operations of the lane marking position detection part.

FIG. 10 is a flowchart showing the operations of the lane marking position detection part 15 and the lane change determination part 16 in detail. That is, FIG. 10 is a flowchart showing operations of Step S20 and Step S30 in detail.

Step S21; Acquiring Original Image

The lane marking position detection part 15 acquires the original image 28 (t) at time t.

Step S22; Binarizing

The original image binarization part 15-1 binarizes the original image 28 (t), and classifies pixels included in the original image 28 (t) into a foreground and a background. For example, assuming that the gradation number of the pixels included in the original image 28 (t) is 256. In this case, the original image binarization part 15-1 calculates brightness values of the pixels. The pixels having the brightness value of 200 or more are classified into the foreground, and the remaining pixels are classified into the background.

Step S23; Performing Hough-Transform

Next, the Hough transform part 15-2 performs Hough transform with using the pixels of the foreground as feature points, and detects a straight line group.

Step S24; Identifying Lane Marking

Next, the left and right lane marking selection part 15-3 identifies left and right lane markings 2 relative to the vehicle 10 based on the detected straight line group. For example, the left and right vehicle lane marking selection part 15-3 identifies straight lines having high voting values of the Hough transform among the detected straight line group as the left and right lane markings 2. Alternatively, straight lines which are the closest to left and right lane markings 2 at the previous time are identified as the left and right lane markings 2. Positions of the identified lane markings 2 are related to time t and stored in the storage part 8 as the relative position data.

The lane marking position detection part 15 performs the above processing of Steps S21 to 24 every time when the original image is acquired by the original image acquirement part 14.

It should be noted that a specific configuration of the lane marking position detection part 15 is not limited to the above configuration. The lane marking position detection part 15 may be formed so as to detect the straight lines indicating the left and right lane markings 2.

Step S30; Determining Whether Or Not Vehicle Crosses Lane Marking

Processing at the present time t0 will be focused on. At the present time t0, the lane change determination part 16 determines whether or not the vehicle 10 crosses any of the left and right lane markings 2. Specifically, the lane change determination part 16 refers to the relative position data. The relative positions of the left and right lane markings 2 are chronologically grasped up to time t0. When any of the left and right lane markings 2 exceeds a predetermine range including a center of the vehicle 10 (such as a range of ±70 cm around the center of the vehicle) before time t0, the lane change determination part 16 determines that the vehicle 10 crosses the lane marking 2.

Successively, configurations and operations of the second image generation part 18 and the inclination calculation part 21 will be described in detail.

Figure 11:
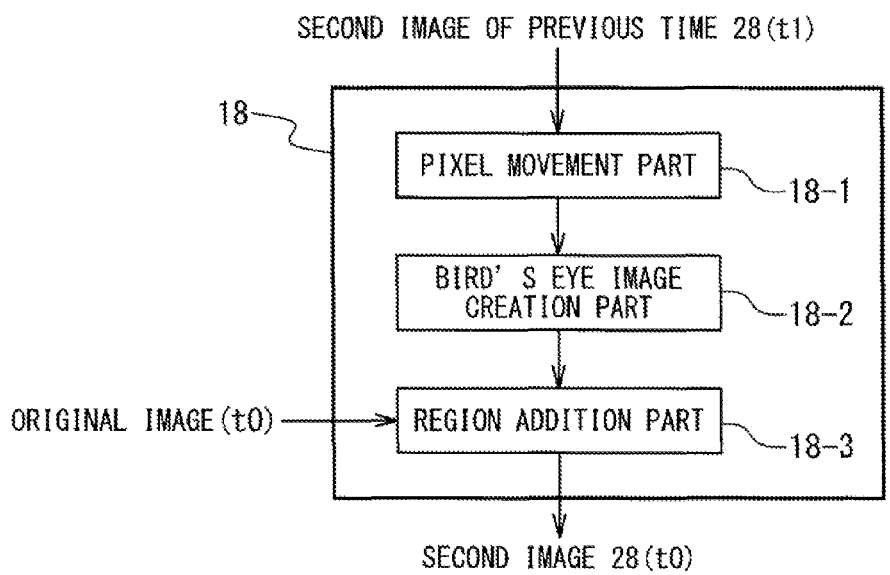
FIG. 11 is a functional configuration diagram showing a second image generation part.

FIG. 11 is a functional configuration diagram specifically showing the second image generation part 18. The second image generation part 18 includes a pixel movement part 18-1, a bird's eye image creation part 18-2, and a region addition part 18-3.

Figure 12:
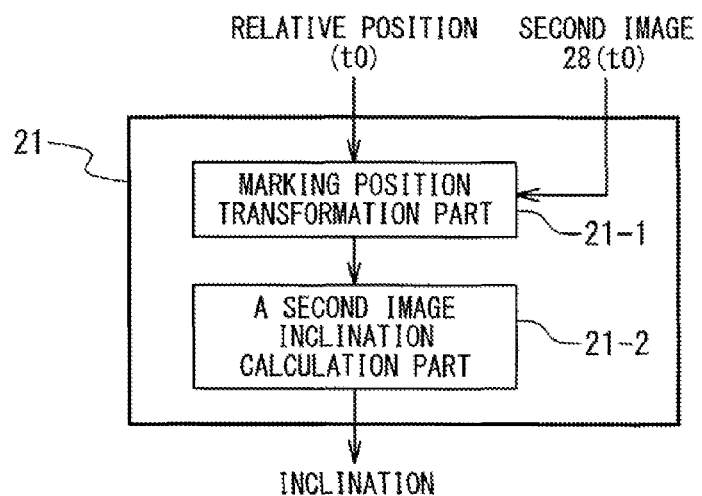
FIG. 12 is a functional configuration diagram showing an inclination calculation part.

FIG. 12 is a functional configuration diagram specifically showing the inclination calculation part 21. The inclination calculation part 21 includes a marking position transformation part 21-1, and a second image inclination calculation part 21-2.

Figure 13:
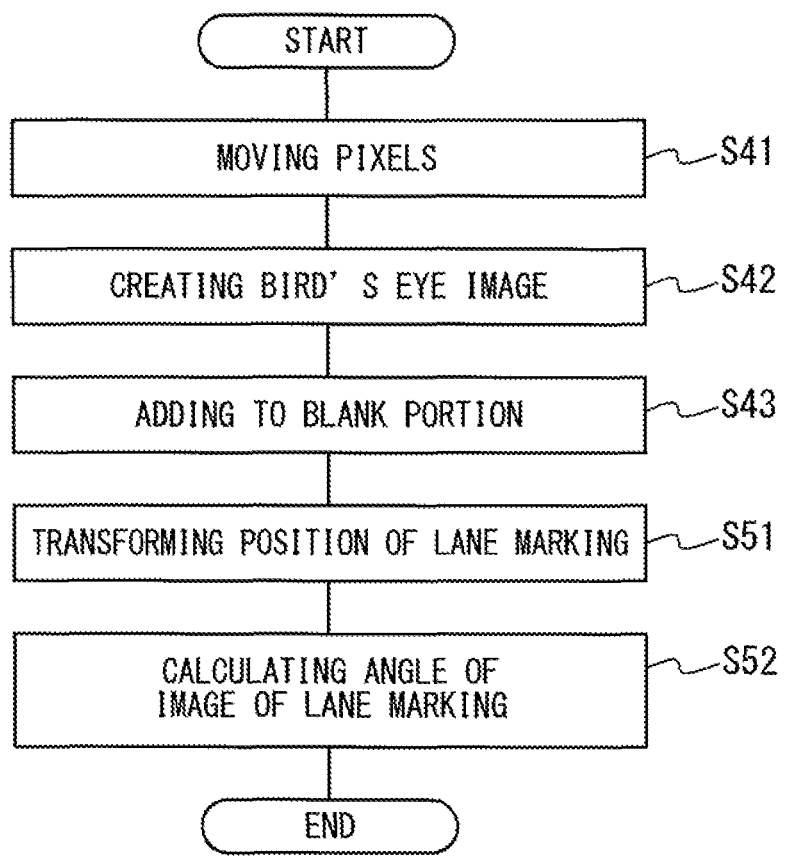
FIG. 13 is a flowchart showing operations of the second image generation part and the inclination calculation part.

FIG. 13 is a flowchart showing the operations of the second image generation part 18 and the inclination calculation part 21. That is, FIG. 13 is a flowchart showing operations of Step S40 to Step S50.

Step S41; Moving Pixels

Processing at time t0 will be focused on. As shown in FIG. 6, the pixel movement part 18-1 moves the pixels of the second image 27 (t1) obtained at past time t1 toward the far side in accordance with a moving quantity of the vehicle 10. For example, it is assumed that a lowest part of the second image 27 (t1) (an end in the near direction of the vehicle) corresponds to a position 1 m distant from a front end of the camera 1. It is assumed that one pixel corresponds to a region of 5 cm by 5 cm on a road surface. Furthermore, it is assumed that the moving quantity of the vehicle 10 from previous time t1 is 50 cm. In this case, the pixel movement part 18-1 moves the pixels in the second image 27 (t1) to the far side by 10 pixels.

Step S42; Creating Bird's Eye Image

The bird's eye image creation part 18-2 creates a bird's eye image of a near region of the first image 28 (t0). At this time, a range of the near region should be a range corresponding to the moving quantity of the vehicle 10 in the real world.

Figure 14:
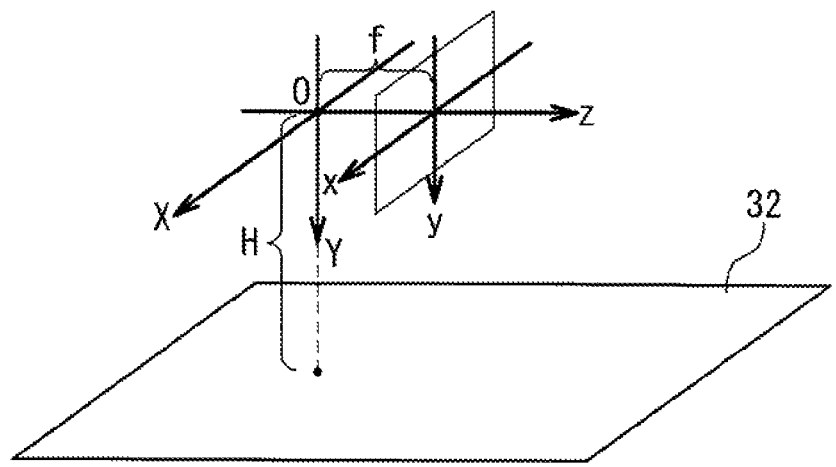
FIG. 14 is an explanation diagram for explaining the operations of the second image generation part.

Hereinafter, creation of the bird's eye image will be described in detail. FIG. 14 is an illustrative diagram for illustrating operations of the bird's eye image creation part 18-2.

As shown in FIG. 14, the bird's eye image creation part 18-2 sets coordinate systems of the camera 1. In the present example, it is assumed that transformation from the real world into the original image is perspective transformation. It is assumed that there are no other causes of the transformation due to distortion of a lens or the like. In FIG. 14, the coordinate system of the real world is indicated by X, Y, and Z, and the coordinate system of the original image is indicated by x and y. The X axis and the x axis, and the Y axis and the y axis are respectively parallel to each other. A focal distance in the perspective transformation is indicated as f. It is assumed that a road surface 32 is a plane perpendicular to the Y axis. A distance from the origin of the coordinate system of the real world to the road surface 32 is indicated as H. In this case, coordinates (xi, yi) in the original image corresponding to a point (Xi, H, Xi) on the road surface 32 are expressed by the following expression (1).

(Expression 1)

$$\begin{cases} x_i = f \dfrac{X_i}{Z_i} \\ y_i = f \dfrac{H}{Z_i} \end{cases} \quad (1)$$

The bird's eye image is an image in which the road surface 32 is viewed vertically downward in the real world. That is, the coordinates on the road surface 32 in the real world are quantized at proper intervals (such as 5 cm by 5 cm). Therefore, in order to transform a partial image into a transformed image, the bird's eye image creation part 18-1 determines that which pixel in the first image corresponds to which pixel in the transformed image element, by the above expression (1). The bird's eye image creation part 18-1 sets brightness of the pixels in the transformed image element as brightness of the corresponding pixels of the first image. It should be noted that if there is a transformation cause other than the perspective transformation such as the distortion of the lens or the like exists in the imaging coordinate system of the camera, a transformation expression in consideration with the transformation cause may be used instead of the expression (1).

Step S43; Adding To Blank Portion

The region addition part 18-3 adds the bird's eye image to a blank portion of the image 27 (t1)* in which the pixels are moved. Thereby, the second image 27 (t0) at time t0 is obtained.

Successively, the operations of the inclination calculation part 21 will be described.

Step S51; Transforming Position of Lane Marking

The marking position transformation part 21-1 refers to the relative position data, and transforms the position (the relative position at time t0) of the lane marking 2 obtained based on the original image 28 (t0) into a position in the second image 27 (t0) for example based on the expression (1).

Step S52; Calculating Angle of Image of Lane Marking

Figure 15:
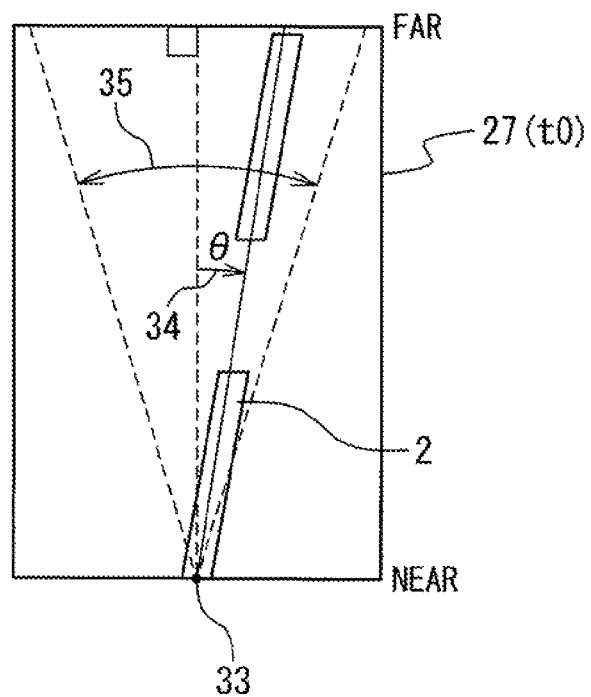
FIG. 15 is an explanation diagram for explaining the operations of the inclination calculation part.

The second image inclination calculation part 21-2 calculates inclination of the lane marking 2 in the second image 27 (t0). Hereinafter, operations of the second image inclination calculation part 21-2 will be described in detail. FIG. 15 is an illustrative diagram for illustrating the operations of the second image inclination calculation part 21-2.

The position of the lane marking 2 in the second image (t0) obtained in Step S51 is defined as an original image lane marking position 33. The second image inclination calculation part 21-2 sets the original image lane marking position 33 to a near segment (an end on the near side of the vehicle) in the second image 27 (t0). The second image inclination calculation part 21-1 sets the lane marking 2 so as to extend from the position 33. The second image inclination calculation part 21-1 determines an angle θ that is formed by a center line set in the second image 27 (a line extending from the near side of the vehicle to the far side) and the set lane marking 2. The angle θ is set within an angle range 35 that is preliminary set. In such a way, the position of the image of the lane marking 2 is expressed in the second image 27 (t0). For example, the lane marking 2 is set such that the sum of the pixel values in the lane marking 2 is maximum. A specific example will be described. Assuming that the angle range 35 is set to be a range of ±30 degrees from the center line. The second image inclination calculation part 21-1 sets candidates for the lane marking 2 for every one degree within the angle range 35. The sum of the pixel values in the candidates of the lane marking 2 or around the candidates of the lane marking 2 (e.g. a range of 20 cm each on the left and right sides relative to the candidates of the lane marking 2) is calculated. A line with which the sum of the pixel values is maximum among the set candidates of the lane marking 2 is determined as the lane marking 2, so that the angle θ is determined. The second image inclination calculation part 21-1 outputs the determined angle θ as the inclination at time t0.

The second image inclination calculation part 21-1 performs the above processing every time when the original image 28 is acquired. It should be noted that the sum of the pixel values is not necessarily used as an evaluation value used for determining the angle θ. A value expressing properties of the lane marking may be used as the evaluation value.

Figure 16:
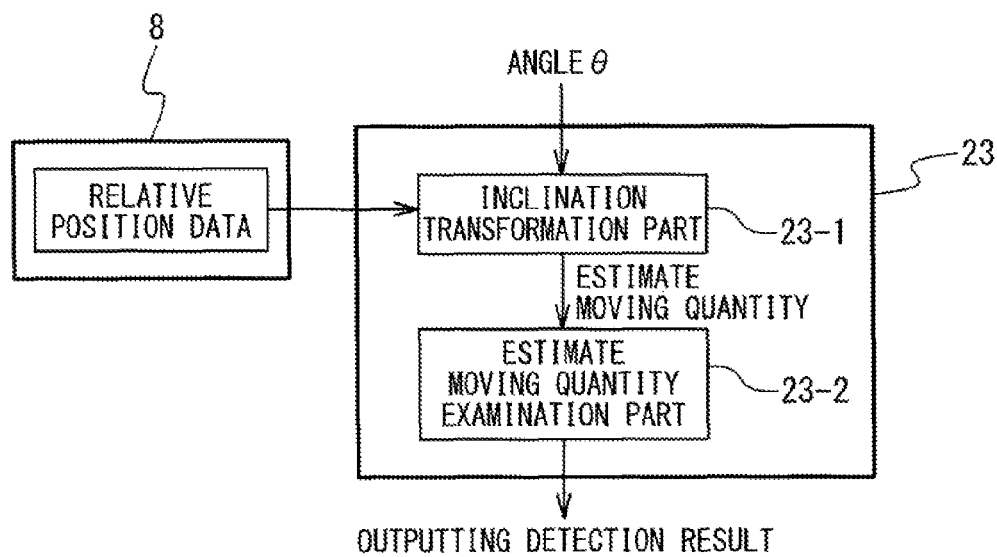
FIG. 16 is a functional configuration diagram showing a comparison part.
Figure 17:
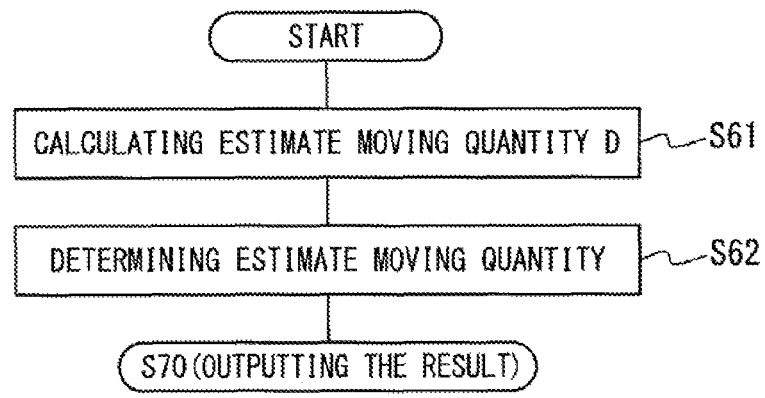
FIG. 17 is a flowchart showing operations of the comparison part.

Successively, a configuration and operations of the comparison part 23 will be described in detail. FIG. 16 is a function block diagram showing the configuration of the comparison part 23 in detail. The comparison part 23 includes an inclination transformation part 23-1, and an estimate moving quantity examination part 23-2. FIG. 17 is a flowchart showing the operations of the comparison part 23, that is, a flowchart showing operations in Step S70.

Step S61; Calculating Estimate Moving Quantity D

The comparison part 23 calculates an estimate moving quantity D in the lateral direction of the lane marking 2 based on the inclination (the angle θ).

Processing at present time t0 will be focused on. The inclination transformation part 23-1 acquires a traveling distance of the vehicle 10 in a unit period (time t1 to t0) from previous time t1 to present time t0 as Rt. Moving quantities Dt in the lateral direction of the lane marking 2 in the unit period (time t1 to t0) are calculated by the following expression (2) with using the angle θ. For example, Rt is obtained from a distance measuring device provided in the vehicle 10.

(Expression 2)

$$D_1 = R_1 \cdot \tan\theta \quad (2)$$

The inclination transformation part 23-1 refers to the relative position data and grasps a period in which the lane marking 2 is positioned within a predetermined range including the center of the vehicle 10 in a front view (hereinafter, referred to as the first range) as a first period. The first range is for example a range of ±70 cm from the center of the vehicle 10 in a front view, and is preliminarily set in the storage part 8 or the like. Next, the inclination transformation part 23-1 calculates the sum total of the moving quantities Dt in the first period as the estimate moving quantity D.

It should be noted that a calculation method of the estimate moving quantities D is not limited to the above method. For example, an average value or a center value of the angles θ in the first period may be used instead of the angle θ. An estimate value θa of the angle θ obtained by a certain method may be used instead of the angle θ. The inclination transformation part 23-1 may calculate a traveling distance R of the vehicle 10 in the first period when the lane marking 2 passes over the first range and determine the estimate moving quantity D according to the following expression (3).

(Expression 3)

$$D = R \cdot \tan\theta_a \quad (3)$$

Step S62; Determining Estimate Moving Quantity

The estimate moving quantity examination part 23-2 compares the estimate moving quantity D with a length of the first range (such as 140 cm). When the lane marking 2 is correctly detected in Step S20, the estimate moving quantity D should correspond to the length of the first range. Therefore, the estimate moving quantity examination part 23-2 determines a difference between the estimate moving quantity D and the length of the first range. In a case where the difference is a predetermined value (such as 20% of the length of the first range) or less, it is determined that the lane marking 2 is correctly detected. That is, it is determined that the determination result of the lane change determination part 16 is correct. Meanwhile, in a case where the difference between the estimate moving quantity D and the length of the first range is larger than the predetermined value, it is determined that the lane marking 2 is incorrectly detected. In this case, it is determined that the determination result of the lane marking determination part 16 is incorrect.

Step S70; Outputting Detection Result

After that, the comparison part 23 outputs the fact that the lane change is performed only in a case where it is determined that the determination in the lane change determination part 16 is correct based on a result of Step S62.

The embodiment and the example of the present invention are described above. However, the embodiment and the example can be variously modified within the scope not departing from the gist of the present invention. For example, a case where the detected relative positions of the lane markings 2 are used for determining whether or not the lane change is performed is described in the above embodiment and the example. However, the present invention is not limited to an apparatus for determining whether or not the lane change is performed. For example, the detected relative positions of the lane marking 2 may be used for detecting that the lane marking 2 is relatively moved from vehicle.

The present application is the National Phase of PCT/JP2009/067471, filed Oct. 7, 2009, which is to claim priority based on Japanese Patent Application No. 2008-271813, and disclosures in Japanese Patent Application No. 2008-271813 are incorporated in the present application by reference.

The invention claimed is:

1. A lane marking detection apparatus, comprising:
   an original image acquirement part configured to acquire an original image that is obtained by taking an image of a traveling road from a traveling object traveling on said traveling road;
   a lane marking position detection part configured to detect a relative position of a lane marking included in said traveling road to said traveling object, based on said original image; and
   an examination part configured to transfer a near region of said original image obtained at time t0 to a first transformed image in which said travelling road is viewed in a first direction that is different from an imaging direction of said original image, transfer near regions of past original images obtained before time t0 to past transformed images in which said travelling road is viewed in said first direction, connect said first transformed image and said past transformed images in an order of time to generate a second image, and confirm whether or not a detection result of said lane marking position detection part is correct based on said second image.

2. The lane marking detection apparatus according to claim 1, further comprising:
   a lane change determination part configured to determine whether or not said traveling object moves over said lane marking, based on said relative position detected by said lane marking position detection part,
   wherein said examination part is configured to examine a detection result of said lane marking position detection part to confirm a determination result of said lane change determination part.

3. The lane marking detection apparatus according to claim 1, wherein said first direction is a direction in which said travelling road is viewed from an upside to a down side in a vertical direction.

4. The lane marking detection apparatus according to claim 3, wherein said examination part comprises:
   an inclination calculation part configured to calculate an inclination of said lane marking indicated in said second image;
   an estimate moving quantity calculation part configured to an estimate moving quantity that is a moving quantity of relative position of said lane marking in a predetermined period, based on said inclination; and
   a comparison part configured to examine a detection result of said lane marking position detection part based on said estimate moving quantity.

5. A car navigation system, comprising:
   a lane marking detection apparatus;
   a position grasp part; and
   a notification part,
   wherein said lane marking detection apparatus comprises:
   an original image acquirement part configured to acquire an original image that is obtained by taking an image of a traveling road from a traveling object traveling on said traveling road;
   a lane marking position detection part configured to detect a relative position of a lane marking included in said traveling road to said traveling object, based on said original image; and
   an examination part configured to transfer a near region of said original image obtained at time t0 to a first transformed image in which said travelling road is viewed in a first direction that is different from an imaging direction of said original image, transfer near regions of past original images obtained before time t0 to past transformed images in which said travelling road is viewed in said first direction, connect said first transformed image and said past transformed images in an order of time to generate a second image, and confirm whether or not a detection result of said lane marking position detection part is correct based on said second image,
   wherein said position grasp part is configured to grasp a position of said travelling body based on an examination result of said examination part, and
   wherein said notification part is configured to notify a position grasped by said position grasp part to a user.

6. A turn signal system, comprising:
   a lane marking detection apparatus; and
   a turn signal control part,
   wherein said lane marking detection apparatus comprises:
   an original image acquirement part configured to acquire an original image that is obtained by taking an image of a traveling road from a traveling object traveling on said traveling road;
   a lane marking position detection part configured to detect a relative position of a lane marking included in said traveling road to said traveling object, based on said original image; and
   an examination part configured to transfer a near region of said original image obtained at time t0 to a first transformed image in which said travelling road is viewed in a first direction that is different from an imaging direction of said original image, transfer near regions of past original images obtained before time t0 to past transformed images in which said travelling road is viewed in said first direction, connect said first transformed image and said past transformed images in an order of time to generate a second image, and confirm whether or not a detection result of said lane marking position detection part is correct based on said second image,
   wherein said turn signal control part is configured to control a turn signal provided on said travelling road, based on an examination result of said examination part.

7. A lane marking detection method, comprising:
   acquiring an original image that is obtained by taking an image of a traveling road from a traveling object traveling on said traveling road;

detecting a relative position of a lane marking included in said traveling road to said traveling object, based on said original image; and transferring a near region of said original image obtained at time t0 to a first transformed image in which said travelling road is viewed in a first direction that is different from an imaging direction of said original image, transferring near regions of past original images obtained before time t0 to past transformed images in which said travelling road is viewed in said first direction, connecting said first transformed image and said past transformed images in an order of time to generate a second image, and confirming whether or not a detection result of said lane marking position detection part is correct based on said second image.

8. A non-transitory computer-readable medium in which a computer executable program code is stored to attain a lane marking detection method, the method comprising:

acquiring an original image that is obtained by taking an image of a traveling road from a traveling object traveling on said traveling road;

detecting a relative position of a lane marking included in said traveling road to said traveling object, based on said original image; and transferring a near region of said original image obtained at time t0 to a first transformed image in which said travelling road is viewed in a first direction that is different from an imaging direction of said original image, transferring near regions of past original images obtained before time t0 to past transformed images in which said travelling road is viewed in said first direction, connecting said first transformed image and said past transformed images in an order of time to generate a second image, and confirming whether or not a detection result of said lane marking position detection part is correct based on said second image.

* * * * *